Figures 1, 2:
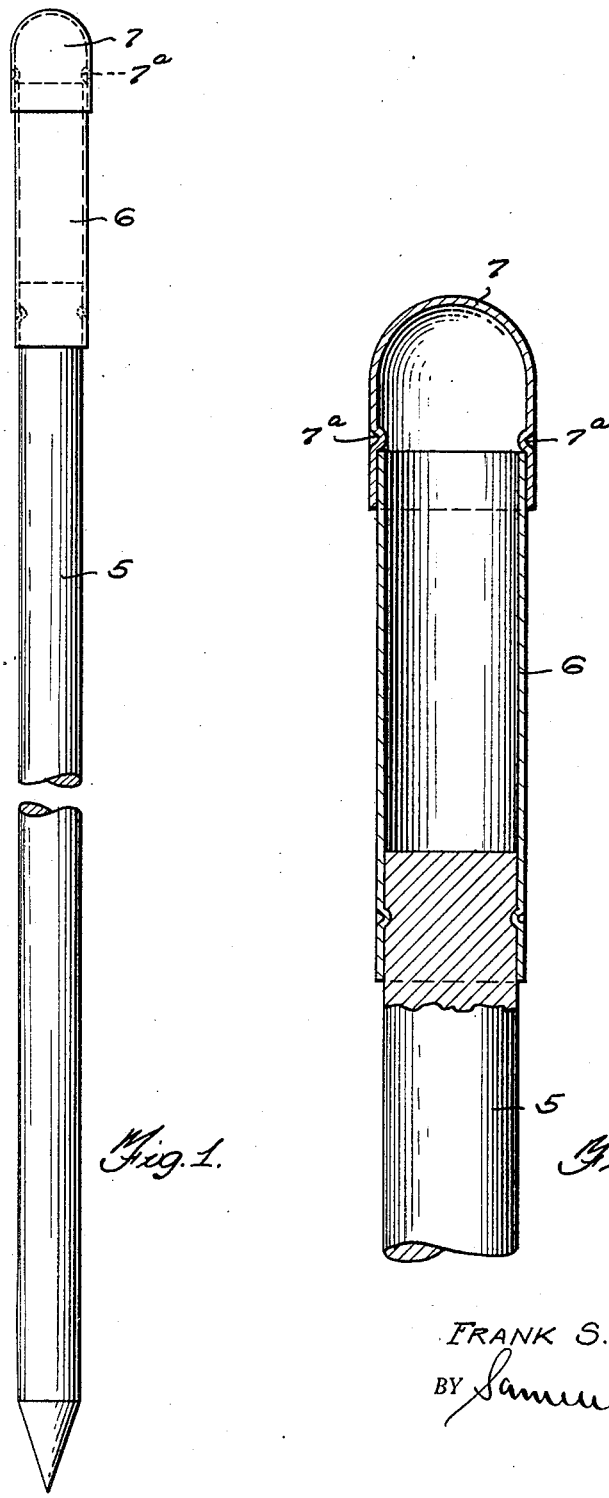

Aug. 30, 1932.  F. S. POLLOCK  1,875,137
PLANT MARKER
Filed May 28, 1930

INVENTOR.
FRANK S. POLLOCK,
BY Samuel Herrick
ATTORNEY.

Patented Aug. 30, 1932

1,875,137

UNITED STATES PATENT OFFICE

FRANK SCOTT POLLOCK, OF WILMINGTON, DELAWARE, ASSIGNOR TO ATLAS POWDER COMPANY, OF WILMINGTON, DELAWARE, A CORPORATION OF DELAWARE

PLANT MARKER

Application filed May 28, 1930. Serial No. 456,521.

The object of the present invention is to provide an improved plant marking device, constructed in such a manner as to provide important points of superiority over known devices of this character.

In the accompanying drawing:

Fig. 1 is a side elevation of a device constructed in accordance with the present invention, and Fig. 2 is a sectional view illustrating the data receiving compartment, hereinafter described.

In the drawing, 5 designates a, preferably, round wooden rod which may be made of maple, or any other suitable hard wood, or a metal rod may be employed, though wood is preferred. A tubular sleeve 6, of any suitable material, but, preferably, of galvanized metal, is crimped upon the upper end of the rod or stake 5, in such manner as to be held against endwise movement with respect thereto, and in such relation to the upper end of the rod or stake 5 as to leave a chamber of suitable size within the tube and above the top of the stake. A cap 7 is adapted to fit over the top of the sleeve 6, and this cap may be provided with suitable indentations 7a, which limit its downward movement with respect to sleeve 6. The cap, sleeve, and stake are thus so related that where the ground is hard, the cap may be utilized as an element upon which to drive, in forcing the stake into the ground, though, ordinarily, the stake may be thrust into the ground without driving it. Thus, the cap and sleeve serve as a protecting and driving means for the upper end of the stake and the interior of the sleeve constitutes a weather proof receptacle for the reception of a paper slip or card of such amplitude as to receive a complete record of the activities and characteristics of the plant over a very considerable period of time, and one which may be added to from time to time by merely removing the cap and withdrawing such record.

The utility of the device of the present invention may be best appreciated by considering the conditions under which it is employed. Where perennial plants are placed in beds, in the home flower garden, it is advisable to have the plants of various types in the same beds, in order to have blooms at all periods, during the summer.

In the spring, the old tops of these plants are rotted down and a marker must be used to show the location of the plant, so that it will not be destroyed and also to designate the type of the plant, color, etc. In the raising of tulips, for example, it is necessary to take out the bulbs every two or three years, and in order to be certain that the proper bulbs are taken up, it is necessary to have the marker contain the date of planting of the bulbs. Further, it is often advisable to use a marker on a plant, the name of which is known, but the color of which is not known. When the plant is first placed in the ground, the marker would be used, giving the name of the plant and after the plant blooms, data as to color, size, vigor, or otherwise, may be placed on the record slip so that proper replanting can be carried out to suit any desired color scheme. The compartment 6 is of sufficient size to receive a record slip of such amplitude that instructions as to the location of the plant during a following season may be entered thereon.

It will be observed that this marker is of rugged construction and may be used over a long period of time, and season after season. It is not limited to the marking of flowers, but may be used for many kinds of plants, or beds of plants, of any description, and may even be used in marking bushes or young trees, where the record as to bearing, etc., may be continued from year to year, on the same card, over a very long period of time. The device is simple and economical in construction, contains no projecting tags or holders which might be bent or knocked off, and is not subject to deterioration, from rust. It is further to be noted that the cap is of opaque material. Consequently, the record contained therein, which will usually be of paper, is not only protected from moisture, but is also protected from light, and, particularly, sunlight. This retards disintegration of the paper and the bleaching or fading of the ink used for writing the data.

It is to be understood that minor changes in construction are contemplated, and that the invention includes within its purview whatever changes fairly come within either the terms or the spirit of the appended claims.

Having described my invention, what I claim is:

1. A device of the character described, comprising a solid wooden body having a pointed wooden end and shaped and dimensioned to adapt it to serve as a plant marking stake, in combination with a metal sleeve of non-corrosive material crimped upon the upper end of said wooden body in a manner to be held against end-wise movement with respect thereto, when sufficient downward force is exerted upon said sleeve to thrust the stake into the ground, said sleeve having an open upper end and projecting above the upper end of the stake-like body a sufficient distance to provide a card or slip receiving compartment of considerable capacity and a closed cap of non-corrosive material fitted upon the upper end of said sleeve and having a bearing upon the upper end of said sleeve in such manner as to adapt the sleeve and body to be driven downwardly under the force of blows upon said cap.

2. A device of the character described, comprising a solid wooden body having a pointed wooden end and shaped and dimensioned to adapt it to serve as a plant marking stake, in combination with a metal sleeve of non-corrosive material crimped upon the upper end of said wooden body in a manner to be held against end-wise movement with respect thereto, when sufficient downward force is exerted upon said sleeve to thrust the stake into the ground, said sleeve having an open upper end and projecting above the upper end of the stake-like body a sufficient distance to provide a card or slip receiving compartment of considerable capacity and a cap of non-corrosive material having a sliding fit upon the upper end of said sleeve, said cap being provided with an indented portion constituting a shoulder which bears upon the upper end of the sleeve to adapt the cap to serve as means through which the sleeve and body may be driven into the ground.

In testimony whereof I affix my signature.

FRANK SCOTT POLLOCK.